R. G. STANDERWICK.
GEAR AND PULLEY DEVICE.
APPLICATION FILED APR. 13, 1916.

1,217,654.

Patented Feb. 27, 1917.

Inventor,
Reginald G. Standerwick,
by
Att'y.

UNITED STATES PATENT OFFICE.

REGINALD G. STANDERWICK, OF LYNN, MASSACHUSETTS, ASSIGNOR TO GENERAL ELECTRIC COMPANY, A CORPORATION OF NEW YORK.

GEAR AND PULLEY DEVICE.

1,217,654.  Specification of Letters Patent.  Patented Feb. 27, 1917.

Application filed April 13, 1916. Serial No. 90,859.

*To all whom it may concern:*

Be it known that I, REGINALD G. STANDERWICK, a subject of the King of Great Britain, residing at Lynn, in the county of Essex, State of Massachusetts, have invented certain new and useful Improvements in Gear and Pulley Devices, of which the following is a specification.

The present invention relates to an improved gear and pulley device particularly intended for use in connection with starting, or starting and lighting outfits for automobiles. In installing such outfits on cars it is necessary to fasten certain parts to the engine shaft end, the diameter of which may vary more or less in different cars even of the same type and make, and the object of the present invention is to provide an improved arrangement of the parts which are to be fastened to the engine shaft end so that they may be readily and firmly fixed on a shaft end even though it be slightly over or under size.

For a consideration of what I believe to be novel and my invention, attention is directed to the accompanying specification and the claims appended thereto.

Figure 1:
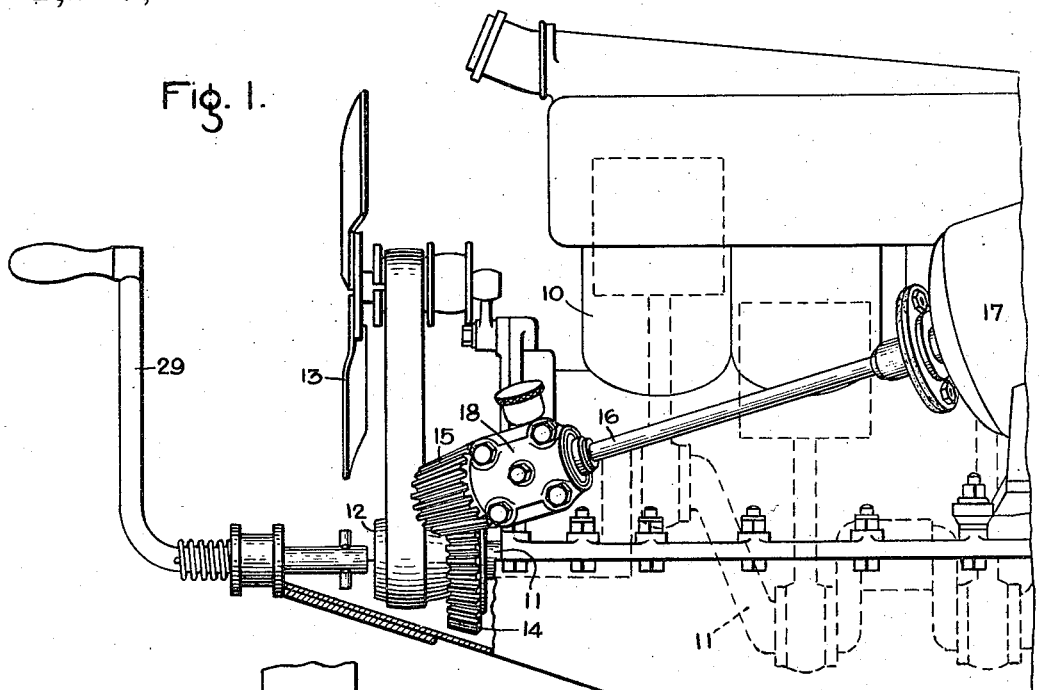
Figure 2:
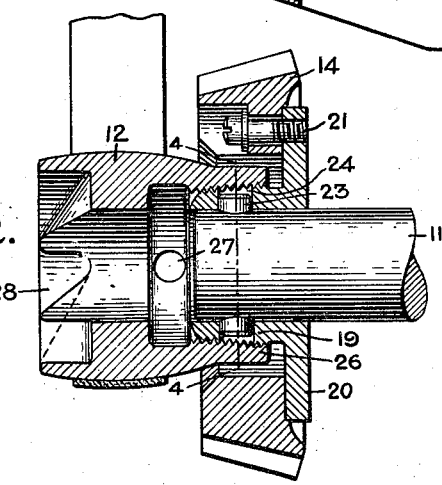
Figure 3:
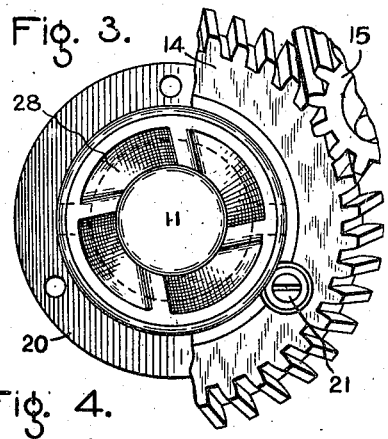
Figure 4:
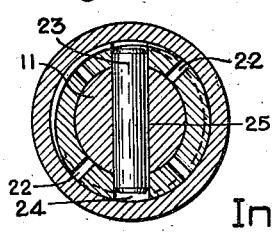
Figure 5:
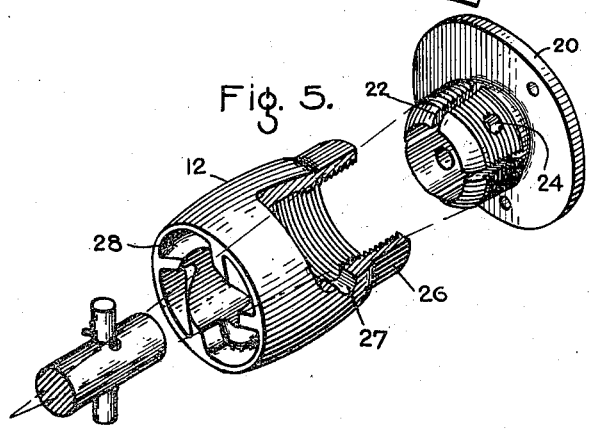

In the drawing, Figure 1 is a diagrammatic view of the forward part of an automobile with a starting and lighting outfit embodying my invention applied thereto; Fig. 2 shows the end of the engine shaft with the parts attached thereto in section; Fig. 3 is a view looking toward the end of the shaft, certain parts being broken away for purposes of illustration; Fig. 4, is a section taken on line 4—4, Fig. 2; and Fig. 5 is a disassembled perspective view of some of the parts.

Referring to the drawing, 10 indicates an internal combustion engine which may be of any suitable design, and 11 indicates the crank shaft, the end of which extends out beyond the forward bearing to receive certain of the parts of the starting and lighting outfit, which parts comprise a pulley 12 from which the ventilating fan 13 is driven, and a gear wheel 14 which meshes with a gear wheel 15 on the shaft 16 of the starting and lighting dynamo electric machine 17. It will be understood that in starting, the machine 17 is utilized as a motor, while when the engine is running it is utilized as a generator. The machine 17 is suitably supported at the rear of the engine and the forward end of the shaft 16 is supported in a bearing 18. 19 indicates a sleeve which slips over the end of the shaft 11 and has a flange 20 to which is fastened the gear wheel 14 as by bolts 21. The sleeve thus forms in substance the hub of the gear wheel. The sleeve 19 tapers from the end next to the flange toward the other end and is threaded on the exterior. It is also provided with slots 22 so that it may be squeezed down tightly on to the shaft. It is locked on to the shaft by a pin 23 which is driven through openings 24 in it and through an opening 25 in the shaft. Formed integrally with the pulley 12 is a nut 26 which threads over the sleeve 19, 27 being an opening in it to receive a tool for screwing it tightly into position. The inside of the nut is tapered the same as is the sleeve 19. The outer end of the pulley is provided with ratchet teeth 28 to receive the end of the cranking arm 29 in case it is found necessary to crank the engine by hand.

In mounting the parts on the end of the engine shaft 11, the sleeve 19 is slipped over it into place and the pin 23 driven in. The gear wheel 14 is then fastened to the flange 20. By arranging the gear wheel 14 so that it surrounds the sleeve 19, the structure is materially shortened, and by making it separate from the flange it does not interfere with the insertion of the pin 23. The nut 26 carried by pulley 12 is next threaded over the end of the sleeve 19 and screwed up until the sleeve is tightly clamped on to the shaft. Since the nut and sleeve are tapered and the sleeve is split, it will be clear that the parts can be put on shafts which may vary somewhat in diameter and whether it be slightly over-size or undersize.

By the above described arrangement I provide a simple structure of combined pulley and gear wheel arrangement which can be quickly and readily applied to the shaft end, and which is compact so as to readily occupy the limited space available for it.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. The combination with a shaft end of a gear wheel, a split tapered threaded sleeve forming a hub for the wheel, said sleeve surrounding the shaft, and a pulley having a tapered nut formed integral therewith which threads over the tapered sleeve.

2. The combination with a shaft end of a gear wheel, a split tapered threaded sleeve forming a hub for the wheel, a pin for locking it on the shaft, and a pulley having a tapered nut which threads over the tapered sleeve, the toothed portion of said gear wheel surrounding the sleeve.

3. The combination with an internal combustion engine, a fan, and a dynamo-electric machine, of a combined pulley and gear wheel on the engine shaft for driving the fan and connecting with the dynamo-electric machine respectively, the same comprising a split tapered threaded sleeve having a flange, a gear wheel fixed to the flange, a pulley, and a tapered threaded nut carried thereby and threaded over said sleeve.

4. The combination with a gear wheel and a pulley, of a split tapered threaded sleeve carried by one of them, and a tapered threaded nut carried by the other, said nut being adapted to screw over the sleeve.

5. In an apparatus of the character described the combination with a shaft of a pulley provided with ratchet teeth, and a tapered threaded nut formed integral therewith, and adapted to be fastened on to the end of said shaft.

In witness whereof, I have hereunto set my hand this eleventh day of April, 1916.

REGINALD G. STANDERWICK.